United States Patent
Chen et al.

(10) Patent No.: US 11,053,135 B2
(45) Date of Patent: Jul. 6, 2021

(54) SCALABLE PROCESS FOR MANUFACTURING IRON COBALT NANOPARTICLES WITH HIGH MAGNETIC MOMENT

(71) Applicant: Aegis Technology Inc., Santa Ana, CA (US)

(72) Inventors: Qi Chen, Santa Ana, CA (US); Zhigang Lin, Santa Ana, CA (US)

(73) Assignee: Aegis Technology Inc., Santa Ana, CA (US)

( * ) Notice: Subject to any disclaimer, the term of this patent is extended or adjusted under 35 U.S.C. 154(b) by 248 days.

(21) Appl. No.: 16/403,468

(22) Filed: May 3, 2019

(65) Prior Publication Data
US 2020/0361784 A1   Nov. 19, 2020

(51) Int. Cl.
*B22F 9/24* (2006.01)
*C01G 51/00* (2006.01)
(Continued)

(52) U.S. Cl.
CPC ....... *C01G 51/003* (2013.01); *C01G 49/0009* (2013.01); *B82Y 30/00* (2013.01);
(Continued)

(58) Field of Classification Search
None
See application file for complete search history.

(56) References Cited

U.S. PATENT DOCUMENTS 7,029,514 B1   4/2006 Yang
7,527,875 B2   5/2009 Mizuno
(Continued)

FOREIGN PATENT DOCUMENTS

JP   2010/189679 A   *   9/2010

OTHER PUBLICATIONS

English Translation of JP 2010-189679 (originally published Sep. 2, 2010) from Espacenet.*
(Continued)

*Primary Examiner* — George Wyszomierski
(74) *Attorney, Agent, or Firm* — Charles H. Jew

(57) ABSTRACT

Producing $Co_xFe_{100-x}$, where x is an integer from 20 to 95, nanoparticles by: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles, wherein step (c) occurs in an essentially oxygen-free environment. The nanoparticles are annealed at ambient temperatures to yield soft nanoparticles with targeted particle size, saturation magnetization and coercivity. The chemical composition, crystal structure and homogeneity are controlled at the atomic level. The CoFe magnetic nanoparticles have $M_s$ of 200-235 emu/g, $(H_c)$ coercivity of 18 to 36 $O_e$ and size range of 5-40 nm. The high magnetic moment CoFe nanoparticles can be employed in drug delivery, superior contrast agents for highly sensitive magnetic resonance imaging, magnetic immunoassay, magnetic labeling, waste water treatment, and magnetic separation.

16 Claims, 7 Drawing Sheets

(51) Int. Cl.
  *C01G 49/00*  (2006.01)
  *B82Y 30/00*  (2011.01)
  *B82Y 40/00*  (2011.01)

(52) U.S. Cl.
  CPC ........... *B82Y 40/00* (2013.01); *C01P 2004/04* (2013.01); *C01P 2004/64* (2013.01); *C01P 2006/42* (2013.01)

(56) References Cited

U.S. PATENT DOCUMENTS

| | | | |
|---|---|---|---|
| 7,781,078 | B2 | 8/2010 | van de Veerdonk |
| 7,811,545 | B2 | 10/2010 | Hyeon |
| 8,632,884 | B2 | 1/2014 | Ying |
| 9,427,805 | B2 | 8/2016 | Rowe |
| 2004/0170820 | A1 | 9/2004 | Yadav |
| 2006/0118158 | A1 | 6/2006 | Zhang |
| 2010/0143263 | A1 | 6/2010 | Cheon |
| 2014/0346389 | A1 | 11/2014 | Rowe |
| 2015/0014573 | A1* | 1/2015 | Rowe ..................... C22C 33/02 252/62.55 |
| 2015/0147217 | A1 | 5/2015 | Johnson |
| 2016/0203981 | A1 | 7/2016 | Williams |
| 2016/0271591 | A1* | 9/2016 | Jiang ........................ B01J 23/75 |
| 2020/0265976 | A1* | 8/2020 | Yamamoto .......... H01F 1/14775 |

OTHER PUBLICATIONS

G. Chaubey et al., Synthesis and Stabilization of FeCo Nanoparticles, Journal of the American Chemical Society, 129, pp. 7214-7215, 2007.

W. S. Seo et al., FeCo/graphitic-shell nanocrystals as advanced magnetic-resonance and near-infrared agents, Nature Materials, vol. 5, pp. 971-976, Dec. 2006.

C. Desvaux et al., Multimillimetre-large Superlattices of air-stable iron-cobalt nanoparticles, Nature Materials, vol. 4, pp. 750-753, Oct. 2005.

C. Wang et al., Synthesis of High Magnetic Moment CoFe Nanoparticles via Interfacial Diffusion in Core/Shell Structured Co/Fe Nanoparticles, Nano Res. vol. 2, pp. 380-385, 2009.

T. Sourmail, Near equiatomic FeCo alloys: Constitution, mechanical and magnetic properties, Progress in Material Science, vol. 50, pp. 816-880, 2005.

* cited by examiner

SCALABLE PROCESS FOR MANUFACTURING IRON COBALT NANOPARTICLES WITH HIGH MAGNETIC MOMENT

This invention was made with Government support under SBIR Grant No. W15P7T-C-A206 awarded by the U.S. Department of Defense to Aegis Technology Inc. The Government has certain rights to the invention.

FIELD OF THE INVENTION

The present invention generally relates to magnetic nanoparticles (MNPs) and particularly to the manufacture of CoFe-based MNPs with high magnetic saturation.

BACKGROUND OF THE INVENTION

Iron-cobalt based alloys and nanoparticles exhibit particularly important magnetic properties including high Curie temperatures, the highest saturation magnetizations, high permeability, low energy loss, and relatively strong mechanical properties. Magnetic nanoparticles materials are used in magnetic energy, magnetic core and data storage applications. In addition, they are employed in medical procedures, drug delivery, highly sensitive magnetic resonance imaging (MRI) as superior contrast agents, magnetic immunoassay, magnetic labeling, waste water treatment, and magnetic separation such as cell separation.

Incorporating a magnetic hard phase material such as SmFeN and NdFeB with a CoFe-based alloy can yield MNPs that serve as lightweight and quiet permanent magnets that operate efficiently at high temperatures efficiently and with enhanced magnetic performance. These MNPs are used in numerous applications including aircraft motors, generators, actuators, sensors and traveling wave tubes, alternators, DC motors for magnetic tools, robotics, magnetic separators for extracting metals and ores, magnetic bearings, servo-motor drives, lifting apparatuses, brakes and clutches, meters and measuring equipment. They can also be used in the fabrication of small, low-consumption and high-performance inductors for portable communication, where high permeability, in turn, requires homogeneous nanoscale materials with a narrow distribution of local magnetic field in order to get sharper resonance.

The synthesis of monodisperse CoFe nanoparticles (NPs) remains a challenge due to the poor chemical stability of the nanoparticles, although several attempts to synthesize CoFe nanoparticles have been made to obtain nanoparticles with targeted sizes and distribution, and composition. Superlattice multilayers of the CoFe nanoparticles were successfully obtained as described in G. Chaubey et al, J. Am. Chem. Soc, 2007, 129, 7214. Recently, CoFe/graphite core/shell nanocrystals were formed by chemical vapor deposition as described in Seo et al, Nat. Mat. 2006, 5, 971. High saturation CoFe films however cannot be applied in device fabrication due to the low-deposition rates (usually <8 A°/s) and the high-internal stress of the films derived from deposition.

Chao Wang et al, Nano Res. 2009, 2, 380 disclosed solution phase chemical synthesis for producing various monodisperse magnetic NPs by either simultaneous decomposition of $Co(\eta^3-C_8H_{13})(\eta^4-C_8H_{12})$ or $Co(N(SiMe_3)_2)_2)$ and $Fe(CO)_5$, or by co-reduction of $Co(acac)_2$ and $Fe(acac)_3$ (acac=acetylacetonate). Desvaux et al, Nat. Mat. 2005, 4, 750 synthesized CoFe nanoparticles by co-decomposition of organometallic precursors under hydrogen atmosphere. CoFe NPs made by these processes are chemically unstable and are subject to fast oxidation into various oxides that can be toxic. There are additional problems with current techniques for making Co—Fe nanoparticles, namely: (i) nanoparticles formed can undergo irreversible aggregation which causes settling and, as a result, these nanoparticles are generally difficulty to apply onto systems that are specific to particular applications, (ii) difficulty in controlling the interparticle distances and of the overall geometry of the nanoparticles and therefore current techniques are incapable of reproducible component performances such as for nanocomposites for permanent magnets and soft magnets, (iii) low stability in air, (iv) non-scalability for mass production, and (v) magnetic saturation ($M_s$) of CoFe MNPs prepared has not approached the theoretic value of $M_s$=240 emu/g, not even for $Co_{35}Fe_{65}$ thin film alloys.

Current problems in implementing magnetic NPs materials in general include (i) making the nanoparticles sufficiently small and being able to sustain high magnetic moment, (ii) regulating the interparticle distances and of the overall geometry of the nanoparticles in order to obtain reproducible component performances such as nanocomposites permanent magnet, and (iii) attaining stability in air and manufacturability of the material in a scalable scale.

Attempts to address these problems can be found in U.S. Pat. No. 7,029,514 to Yang et al. "Core-shell magnetic nanoparticles and nanocomposite materials formed therefrom", U.S. Pat. No. 7,781,078 to van de Veerdonk et al. "Method and system for magnetic recording using self-organized magnetic nanoparticles", and U.S. Patent Publication No. 2006/0118158 to Zhang et al., "Nanostructured bulk thermoelectric material"

SUMMARY OF THE INVENTION

The present invention is based in part the development of a cost-effective chemical process that increases the $M_s$ value of CoFe MNPs and wherein the process can be readily scaled-up for mass production. In one aspect, the invention is directed a method of producing CoFe nanoparticles that includes: (a) providing a first aqueous hydroxide solution, preferably a NaOH solution; (b) preparing a second aqueous solution containing iron ions and cobalt ions; and (c) depositing measured volumes of the second aqueous solution into the first aqueous solution whereby co-precipitation yields CoFe alloy nanoparticles, wherein step (c) occurs in an environment that is essentially free of oxygen gas. The CoFe alloy nanoparticles comprise $Co_xFe_{100-x}$ where x is an integer from 20 to 95. The high magnetic moment CoFe alloy nanoparticles typically have diameters 5 nm to 40 nm and preferably from 4 nm to 8 nm.

The magnetic saturation ($M_s$) of the nanoparticles can be close to theoretic $M_s$ for bulk CoFe alloy with $M_s$=240 emu/g. Typically the CoFe alloy nanoparticles of the present invention have $M_s$ from 200 to 235 emu/g and preferably from 210 to 235 emu/g.

The inventive CoFe alloy nanoparticles can be used in high temperature permanent nanocomposite magnets and high temperature soft nanocomposite magnets. Another application is for producing superior contrast agents for highly sensitive magnetic resonance imaging (MRI).

Materials composition and microstructure design, which are related to crystal chemistry and processing, are crucial for tailoring nanostructural features to enhance their magnetic properties. The high structural and composition tolerance of $Co_xFe_{100-x}$ systems with various Co concentrations, in the range from 20% to 95%, provides opportunities for achieving high induction and permeability. The present invention provides a cost-effective, scalable method of fabrication ultra-soft magnetic CoFe nanoparticles via a simple, single-step chemical co-precipitation. The reduction in particle size decreases the magnetocrystalline anisotropy ($K_A$) and thus can potentially reduce the coercivity field ($H_c$). A critical grain size ($d_c$) of ~40 nm, which is close to the domain wall thickness, can be divided into two regimes. When $d>d_c$, $H_c$ increases inversely as the grain size is decreased due to an increase in the magneto-crystalline anisotropy. Below $d_c$, $H_c$ decreases rapidly with a decrease in grain size. The grain refinement ($d<d_c$) diminishes the magnetocrystalline anisotropy because of the averaging effect of magnetization over randomly oriented nano-sized grains, leading to a reduction of $H_c$. Therefore, with reduced particle sizes, the coercivity ($H_c$) of nanoscale materials can be significantly reduced.

The characteristic distance over which an atom influences its surroundings is in the range of 1-40 nm. This enables a large volume to be sampled for averaging the magnetocrystalline anisotropy over many particles which are coupled within this length range. Therefore, the $H_c$ of CoFe nanoparticles can be reduced based on $d^6$ dependence, and in this way the anisotropy of the magnetic nanocrystalline material can be 3 to 4 orders of magnitude smaller than that of the single crystalline in order to achieve higher magnetic saturation. Alternatively, scalable chemical co-precipitation of present invention can achieve CoFe MNPs with $M_s$=235 emu/g, coercivity ($H_c$) of 18 to 36 $O_e$ and size range of 5-40 nm, by using $CoCl_2$ and $FeCl_3$ precursors in the presence of a reducing reagent of NaOH or $NH_3OH$ at room temperature in an Ar and $H_2$ (5% by vol.) atmosphere, followed by heat treatment of as-prepared nanoparticles at low annealing temperature under Ar and $H_2$(5% by vol.) atmosphere.

The process developed for the synthesis of $Co_xFe_{100-x}$ nanoparticles provides the targeted saturation magnetization ($M_s$) and coercivity ($H_c$). The process includes preparation of (1) a Co solution, (2) a Fe solution, and (3) a NaOH solution, which is followed by (4) mixing of the Co, Fe, and NaOH solutions to precipitate $Co_xFe_{100-x}$ nanoparticles (x is, for example, 20, 35, 50, 85, 90, and 95). In one example, the Fe and Co solution in the presence of NaOH or $NH_4OH$ can be precipitated to form CoFe nanoparticles at room temperature, followed by several washings and dryings. The average size of CoFe nanoparticles and size distribution can be controlled to a range of 4 to 8 nanometers in diameter by finely tuning the co-precipitation process such as by controlling the reaction rate and using a protective oxygen-free environment. Furthermore, the particles size of CoFe nanoparticles can be increased by subsequent annealing at low temperatures to achieve targeted magnetic properties. The CoFe nanoparticles system can be controlled by monitoring the Co/Fe ratio in the metal salt solution, using different hydroxide concentrations, and using different [Co] and [Fe] metal to [OH] ratios to finely adjust the particle sizes.

In order to prevent co-precipitation from generating overly large particles, the process is preferably carried out at room temperature, so that "mini" chemical reactions occur in a pool of NaOH solution as the Co and Fe metal solution is added dropwise therein with a micropipette. The technique confines the co-precipitation process to within a small volume in the pool which is approximately the size of the drops from the micropipette. The co-precipitated CoFe alloy nanoparticles typically have diameters of 5-40 nm and preferably of 4-8 nm from a solution of NaOH. It typically takes 1-2 hrs to finish co-precipitation when using 160 ml of NaOH and 160 ml of Co and Fe solution.

A corollary of preparing CoFe nanoparticles with a size range of 4-8 nm is that the duration and temperature of the subsequent heat treatment of the CoFe nanoparticles in an $Ar/H_2$ atmosphere can be reduced as compared to annealing larger as prepared nanoparticles. Lower annealing temperatures prevent increasing the coercivities of nanoparticles and enhance magnetic performance such as by (1) increasing the $M_s$ of the nanoparticles without altering coercivities of the nanoparticles and (2) narrowing the particle size distribution.

The MNPs and MNPs-based nanocomposites, with their high efficiency nanostructured materials, of the present invention can be used in high-power, high temperature magnets. These magnets exhibit high power density and are lightweight. The MNP nanocomposites can be used for both cooling and power generation devices and can be adjusted for various device shapes and sizes.

DETAILED DESCRIPTION OF PREFERRED EMBODIMENTS

The invention is directed to fabrication of magnetic nanoparticles (NPs) with high magnetic moment through chemical co-precipitation. Careful control of the alloy NPs' composition and size, with a narrow size distribution, is necessary for achieving high magnetic moment values. $M_s$ value increases substantially with decreasing nanoparticle size. The inventive chemical synthesis technique employs oxygen-free conditions and controls the chemical process at atomic levels to produce precise alloy compositions and size distributions to achieve large $M_s$ and small $H_c$.

Figure 1:
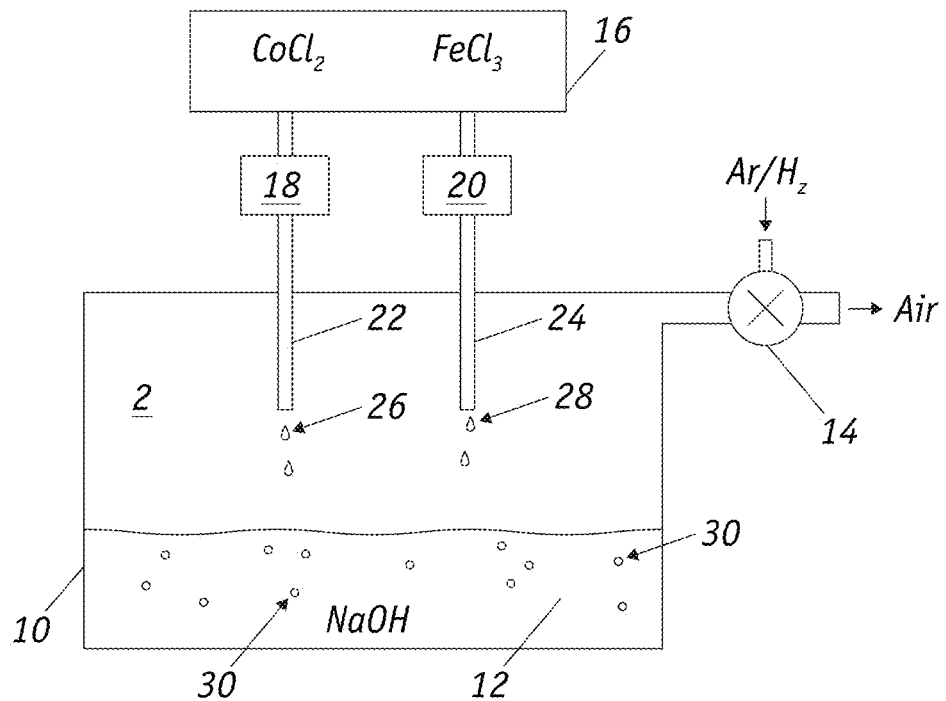
FIG. 1 depicts an apparatus for co-precipitating CoFe nanoparticles.

As shown in FIG. 1, a method of chemical co-precipitation includes preparing an aqueous $CoCl_2$ and $FeCl_3$ metal salt solution in container 16. Preferably, a $CoCl_2$ solution and a $FeCl_3$ solution are prepared separately using distilled water and the two solutions are added into container 16. A hydroxide solution 12, e.g., NaOH solution, is prepared from distilled water in container 10. Air is removed by vacuum from container 10 through valve 14 until the container pressure is a few mTor before Ar or $Ar/H_2$ gas is then pumped into chamber 2 of container 30 so that the inner chamber becomes oxygen free. A pair of tubes 22, 24 connect container 16 to container 10 so that the metal salt solution can be added to the NaOH solution 12 in a regulated fashion. The open distal ends of tubes 22, 24 can have the configurations of pipettes. Metering devices 18, 20 such as controlled mini-pumps can be used to deposit drops 26, 28 of metal salt solution into the NaOH. Droplets 26, 28 typically have volumes of 2 ml to 3 ml and are deposited at a typical rate of 2 to 4 drops per sec and preferably 2 to 3 drops per sec. until the metal salt solution is depleted.

Co-precipitation yields $Co_xFe_{100-x}$ nanoparticles 30. The size of the nanoparticles in FIG. 1 has been enlarged for illustrative purposes as individual nanoparticles cannot be seen by the naked eye. As co-precipitation proceeds, the NaOH solution becomes turbid and develops into a slurry. Co-precipitation preferably is conducted at ambient temperatures of about 20 to 25° C. and typically at 20° C. The slurry is washed with distilled water to remove the NaOH and filtered. Washing and filtering of the slurry is repeated until a pH of about 7 is reached. The nanoparticles are vacuum dried. Finally, the coprecipitated $Co_xFe_{100-x}$ nanoparticles are annealed under an Ar or $Ar/H_2$ environment and a temperature of about 500 to 600° C. and typically at 550° C. for 4 to 6 hours.

The apparatus of FIG. 1 includes two sources 22, 24 from which the metal salt solution is added to the NaOH solution. Using a plurality of sources reduces the overall reaction time to produce a desired quantity of CoFe alloys. When multiple sources are used, each source should be spaced apart so that their respective co-precipitation reactions do not interfere with each other.

Introducing measured amounts of the metal salt solution into the NaOH solution, which is an Ar or $Ar/H_2$ gas oxygen-free, environment, controls the chemical reaction rate and confines the chemical reaction within a limited volume within the NaOH solution 12 in container 10. The technique permits control of the CoFe nanoparticles chemical composition at the atomic level and narrows the particles size distribution.

In particular, operating in an environment without oxygen prevents the formation of $CoFe_2O_4$ during the co-precipitation of CoFe alloys; the presence of $CoFe_2O_4$ would reduce the saturation magnetization ($M_s$) of CoFe nanoparticles. Moreover, the measured introduction of the metal salt solution limits the alloy particle size growth, that is, the technique limits particle size growth by slowing the co-precipitation process by depositing limited amounts of metal salt solution, such as by micro-pipetting, which is conducted at room temperature.

The preferred starting material for preparing the $CoCl_2$ solution is $CoCl_2.6H_2O$ and the starting material for preparing the $FeCl_3$ solution is $FeCl_3.6H_2O$. NaOH is preferred for preparing the hydroxide solution. The co-precipitation reaction that occurs is: $CoCl_2+FeCl_3+NaOH \rightarrow Co_xFe_{1-x}$ (x ranges from 0.2 to 0.95)$+NaCl+H_2O$ (Reaction 1). The value of x is determined by the ratio or stoichiometry of the $Co^{2+}$ and $Fe^{3+}$ in metal salt solution. That is, co-precipitation will generate a CoFe alloy where the proportion of Co to Fe in the alloy is in proportional to the ratio of Co and Fe in the metal salt solution. For example, a metal salt solution with equal molar concentrations of $Co^{2+}$ and $Fe^{3+}$ will coprecipitate $Co_{50}Fe_{50}$, whereas a metal salt solution with a $[Co^{2+}]$ to $[Fe^{3+}]$ ratio of 1 to 2 will generate $Co_{35}Fe_{65}$.

For example, aqueous solutions of $CoCl_2$ and $FeCl_3$ were mixed in a solution of NaOH under the following ratios of $[M]/[OH^-]=0.1, 0.2$ and $0.4$, where $[M]=[Co^{2+}]+[Fe^{3+}]$. The co-precipitation produced a $Co_xFe_{100-x}$ slurry. The slurry was repeatedly centrifuged and washed with water until pH~7 and then filtered and dried in airless drying conditions, followed by subsequent low temperature heat treatment to obtain $Co_xFe_{100-x}$ particle sizes ranging 5-20 nm. To avoid formation of magnetite and $CoFe_2O_4$ phases and to prevent oxidation of $Fe^{2+}$ to $Fe^{3+}$, which can potentially decrease the $M_s$, the particle reduction processes were handled in an airless glove box under Ar or $Ar/H_2$ protection environment.

As illustrated in the system shown in FIG. 1, the amount of CoFe NPs that is co-precipitated depends on (1) the concentration of the metal salt solution and its volume in container 16 and (1) the concentration the hydroxide solution and its volume in container 10. According to Reaction 1, if the volumes of the metal salt and hydroxide solutions are the same, for all the metal salt solution to be completely consumed in the co-precipitation, $[M] \leq [OH^-]$ where $[M]=[Co^{2+}]+[Fe^{3+}]$. Typically, $[M]/[OH^-]$ ranges from 0.1 to 0.2. The typical molar concentrations of the metal and hydroxide solution is 0.2, which will allow achieving a narrow particles size distribution.

Figure 2A:
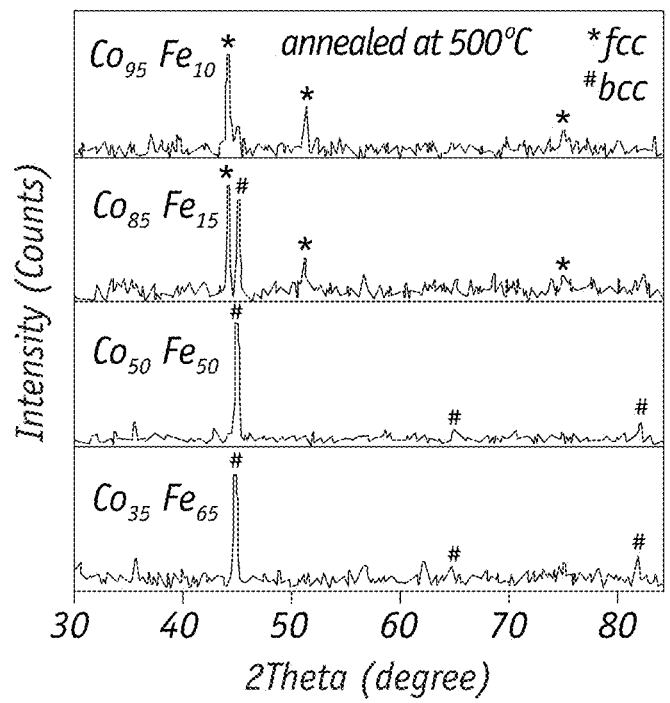
FIGS. 2A, 2B, and 2C are XRD patterns for $Co_xFe_{100-x}$ (x=35, 50, 85, 90, 95) nanoparticles.
Figure 2B:
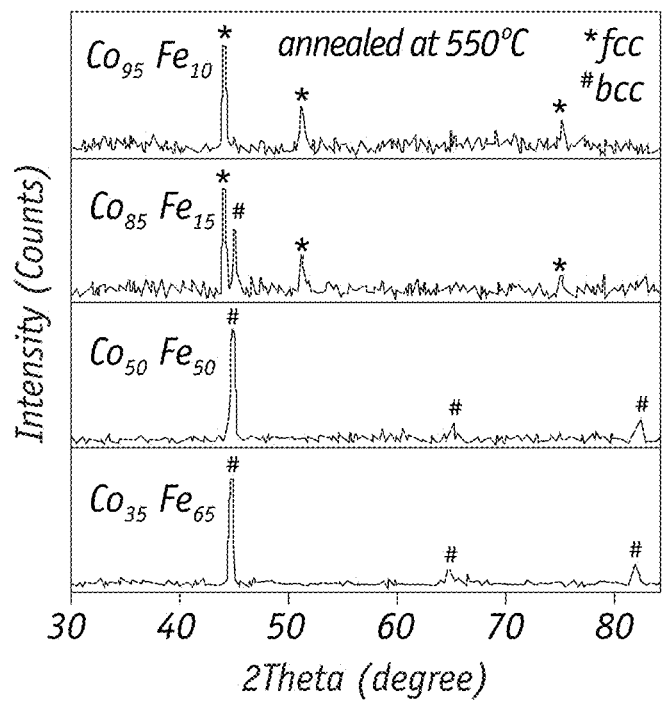
Figure 2C:
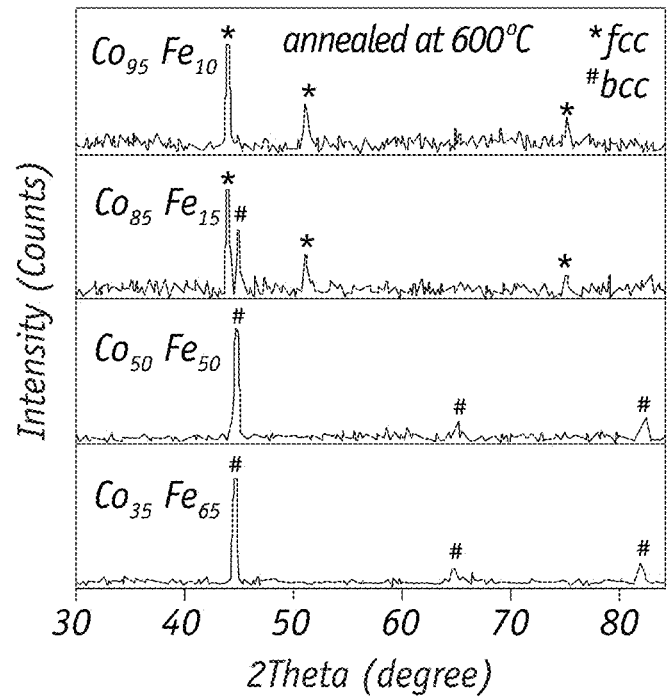

$Co_xFe_{100-x}$ (x=35, 50, 85, 90, 95) nanoparticles were prepared by chemical co-precipitation. The specific CoFe alloy made, that is, the value of x, was determined by the ratio of the $Co^{2+}$ and $Fe^{3+}$ present in the metal salt solution used. The nanoparticles were annealed at different temperatures in $Ar/H_2=5\%$ for 8 hrs. FIGS. 2A, 2B, and 2C are x-ray diffraction patterns for the $Co_xFe_{100-x}$ (x=35, 50, 85, 90, 95) nanoparticles that were prepared. The XRD patterns indicate that the CoFe phase for $Co_{35}Fe_{65}$ and $Co_{50}Fe_{50}$ has a bcc structure and that the CoFe phase for $Co_{85}Fe_{15}$, and $Co_{95}Fe_5$ has a fcc structure.

Figure 2D:
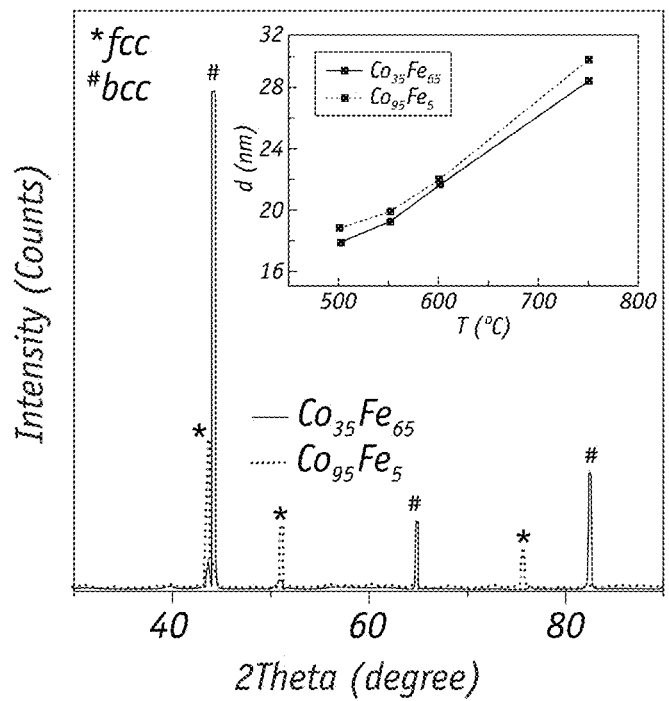
FIG. 2D are XRD patterns for $Co_{35}Fe_{65}$ and $Co_{95}Fe_5$ nanoparticles. Inset shows that grain size increases with increasing annealing temperature.

FIG. 2D is the XRD patterns for $Co_{35}Fe_{65}$ and $Co_{95}Fe_5$ nanoparticles. The inset graph depicts the crystal size of $Co_{35}Fe_{35}$ and $Co_{95}Fe_{95}$ nanoparticles, as determined by the Sherrer equation ($d=0.9\lambda/[B\cos\theta]$), as a function of annealing temperature. A similar dependence pattern of crystal size to annealing temperature for $Co_{50}Fe_{50}$, and $Co_{90}Fe_{10}$ nanoparticles was also observed. The data demonstrate that low annealing temperature leads to smaller particle sizes.

The data in FIGS. 2A, 2B, 2C and 2D show the structural evolution from the bcc structure of the $CoFe_2$ phase for $Co_{35}Fe_{65}$ and $Co_{50}Fe_{50}$ to the fcc structure of the $CoFe_2$ phase for $Co_{85}Fe_{15}$ and $Co_{95}Fe_5$ nanoparticles, which were annealed at 500° C., 550° C. and 600° C. respectively. The higher annealing temperature led to the formation of more pure bcc $CoFe_2$, which contributes to $M_s=240$ emu/g for $Co_{35}Fe_{65}$, and pure fcc $CoFe_2$, which contributes to $M_s=190$ emu/g for $Co_{85}Fe_{15}$. The Co-rich Fe alloy particles tends to exhibit reduced magnetostrictive coefficient ($\lambda$s).

Figure 3A:
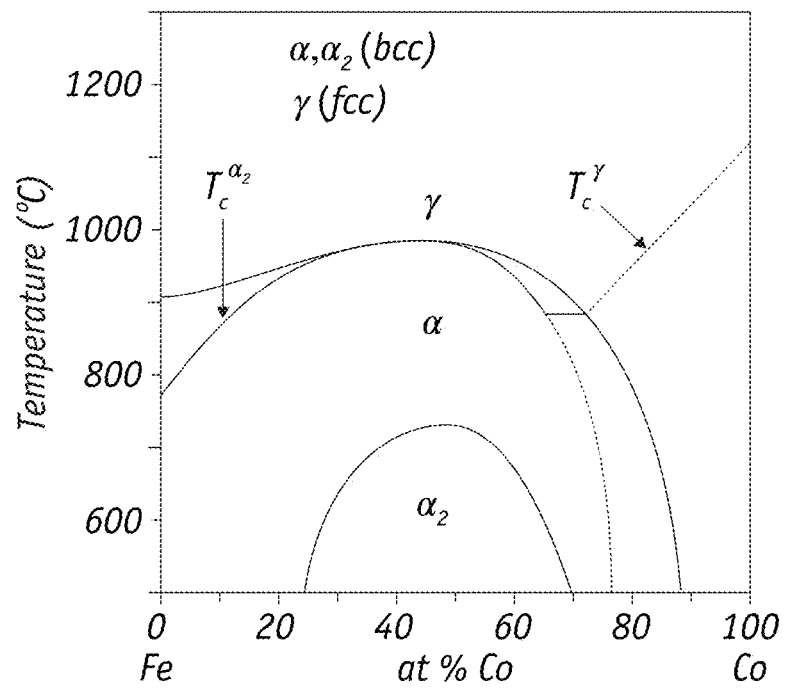
FIG. 3A is phase diagram constructed from XRD pattern for $Co_xFe_{100-x}$ (x=35, 50, 85, 90, 95) nanoparticles.
Figure 3B:
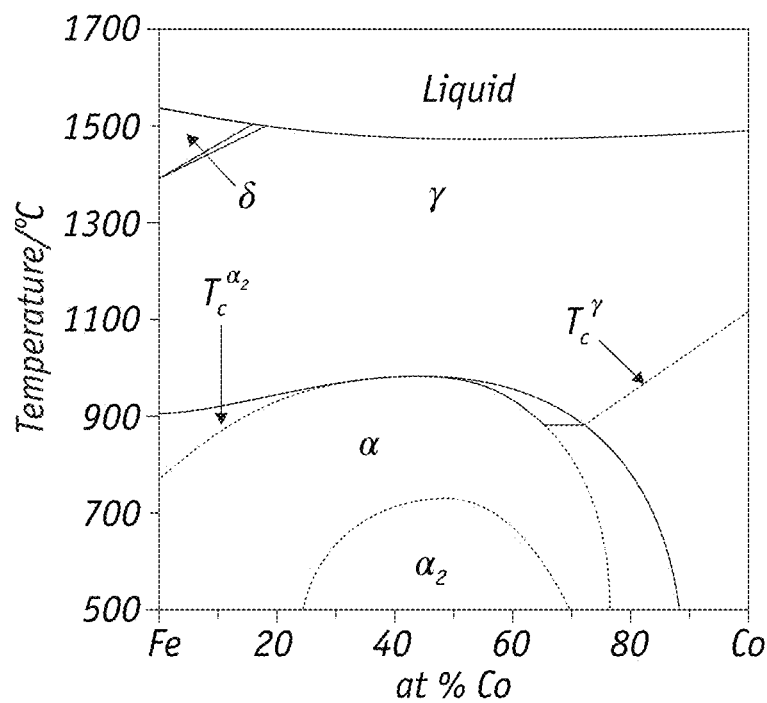
FIG. 3B is a phase diagram for CoFe alloys.

FIG. 3A is phase diagram constructed from XRD patterns of $Co_xFe_{100-x}$ (x=35, 50, 85, 90, 95) nanoparticles that were prepared by chemical co-precipitation and annealed at different temperatures in $Ar/H_2=5\%$ for 8 hrs. FIG. 3B is a phase diagram of CoFe alloys which was reported in Sourmail, Progress in Material Science, 50 (2005) 816-880. The phase diagram for the $Co_xFe_{100-x}$ nanoparticles prepared by chemical co-precipitation of the present invention exhibit similar characteristics to that of the prior art CoFe alloys.

Figure 4A:
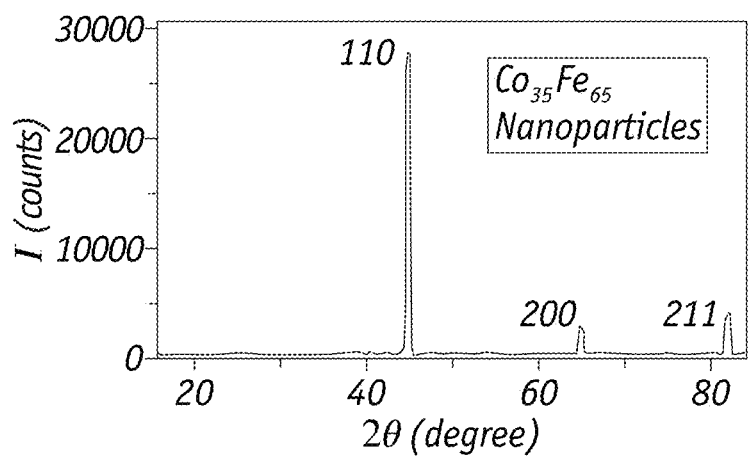
FIG. 4A is an XRD pattern for $Co_{35}Fe_{65}$ nanoparticles.
Figure 4B:
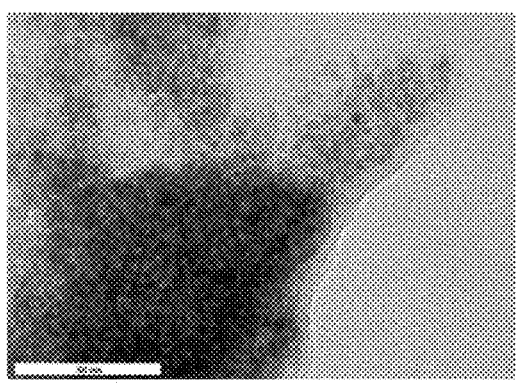
FIGS. 4B and 4C are TEM images of as prepared and annealed $Co_{35}Fe_{65}$ nanoparticles respectively.
Figure 4C:
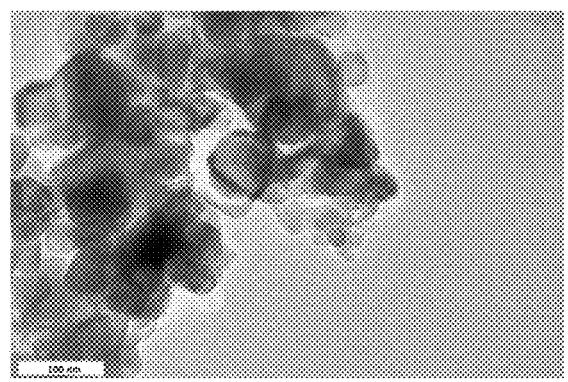

FIG. 4A is the XRD for $Co_{35}Fe_{65}$ nanoparticles containing pure $CoFe_2$ with a $M_s=235$ emu/g and particles sizes of 4-10 nm. The nanoparticles were prepared by co-precipitation. These initial nanoparticles were then annealed at 600° C. for 8 hrs, in $Ar/H_2$. After annealing, the grain sizes increased to 20-60 nm. FIGS. 4B and 4C are transmissions electron microscopy images the initial nanoparticles and the annealed nanoparticles, respectively.

Figure 5A:
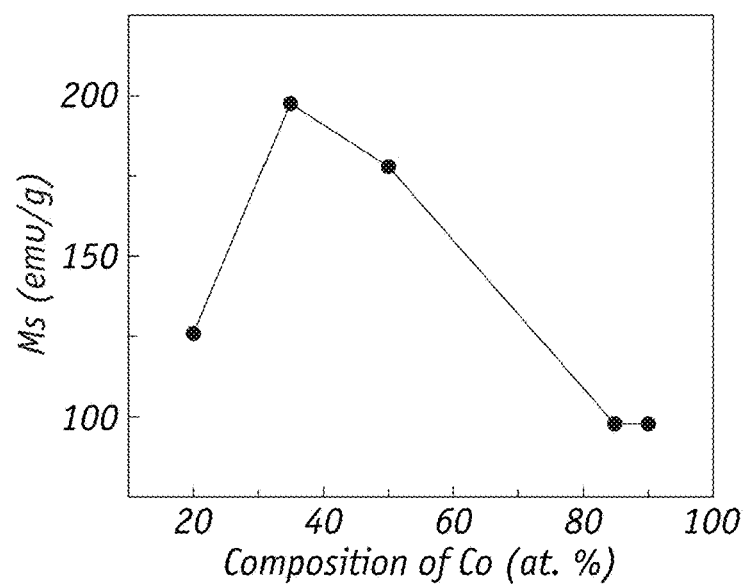
FIG. 5A is a graph of $M_s$ vs. atomic % of cobalt in $Co_xFe_{100-x}$ (x=20, 35, 50, 85, 90) nanoparticles.
Figure 5B:
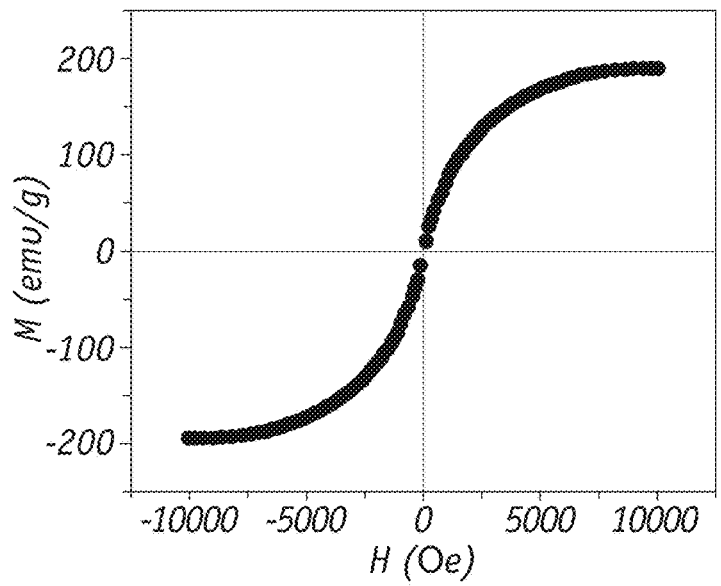
FIG. 5B is a hysteresis loop for $Co_{35}Fe_{35}$ nanoparticles.

FIG. 5A is a graph of $M_s$ as a function of cobalt in $Co_xFe_{100-x}$ (x=20, 35, 50, 85, 90) nanoparticles that were that were prepared by chemical co-precipitation and annealed at 600° C. in an Ar/H$_2$=5% mixture for 8 hrs. The highest Ms is seen in the Co$_{35}$Fe$_{65}$ nanoparticles. FIG. 5B is a graph of M v. H and showing a hysteresis loop that was measured at room temperature for the Co$_{35}$Fe$_{35}$ nanoparticles.

Figure 6A:
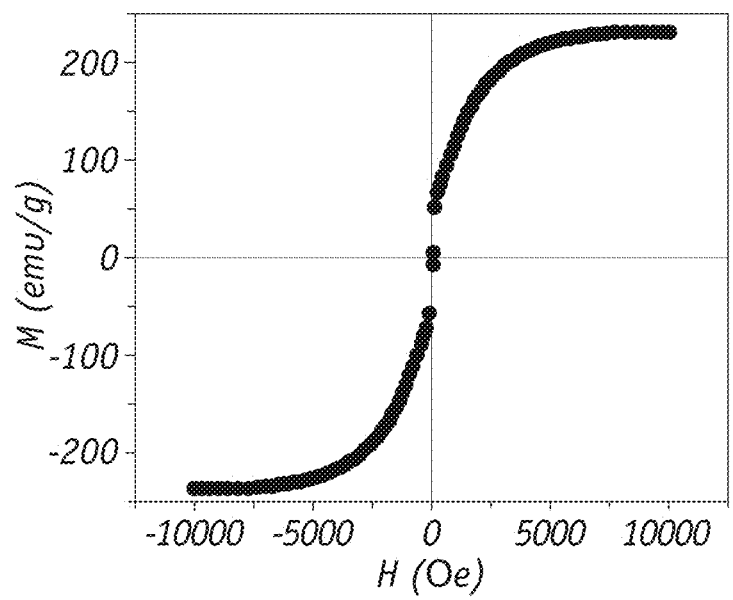
FIG. 6A is a hysteresis loop for $Co_{35}Fe_{65}$ nanoparticles.
Figure 6B:
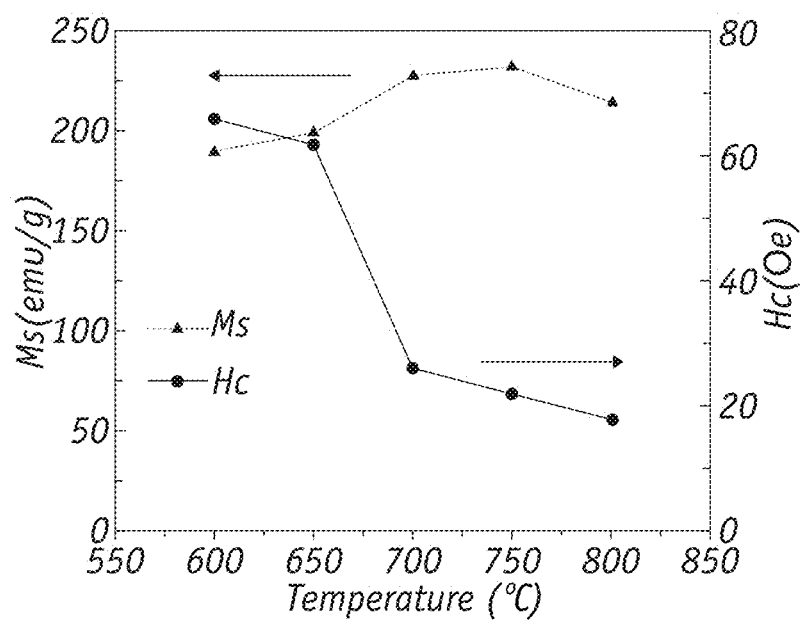
FIG. 6B is a graph of $M_s$ and $H_c$ vs. annealing temperatures for $Co_{35}Fe_{65}$ nanoparticles.

FIG. 6A is a graph of M v. H and showing a hysteresis loop that was measured at room temperature for Co$_{35}$Fe$_{65}$ nanoparticles which prepared by co-precipitation and subsequent annealed at 750° C. for 8 hrs, under an Ar/H$_2$=5% mixture. FIG. 6B is a graph of M$_s$ and H$_c$ vs. annealing temperatures for Co$_{35}$Fe$_{65}$ nanoparticles which were prepared by co-precipitation and annealed at different temperatures for 8 hrs. under an Ar/H$_2$=5% mixture.

Figure 6C:
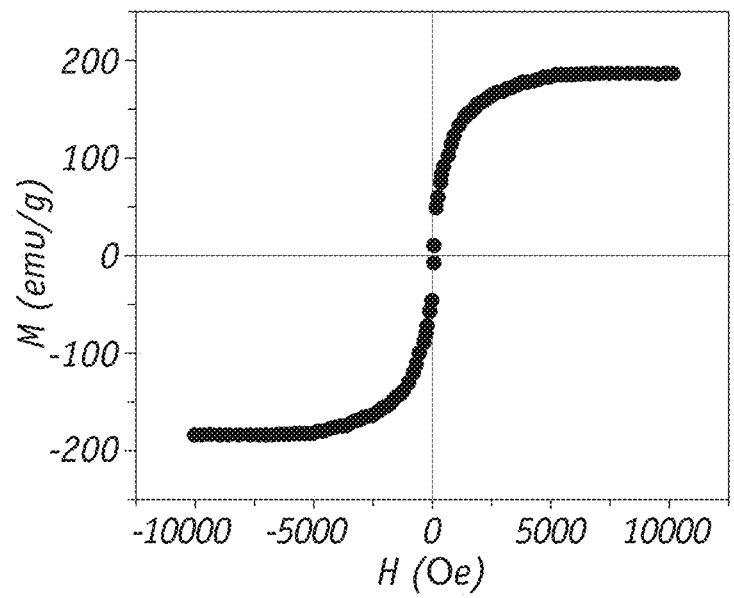
FIG. 6C is a hysteresis loop for $Co_{95}Fe_5$ nanoparticles.

FIG. 6C is a graph of M v. H and showing a hysteresis loop that was measured at room temperature for Co$_{95}$Fe$_5$ nanoparticles which prepared by co-precipitation and subsequent annealed at 750° C. for 8 hrs, under an Ar/H$_2$=5% mixture.

Figure 6D:
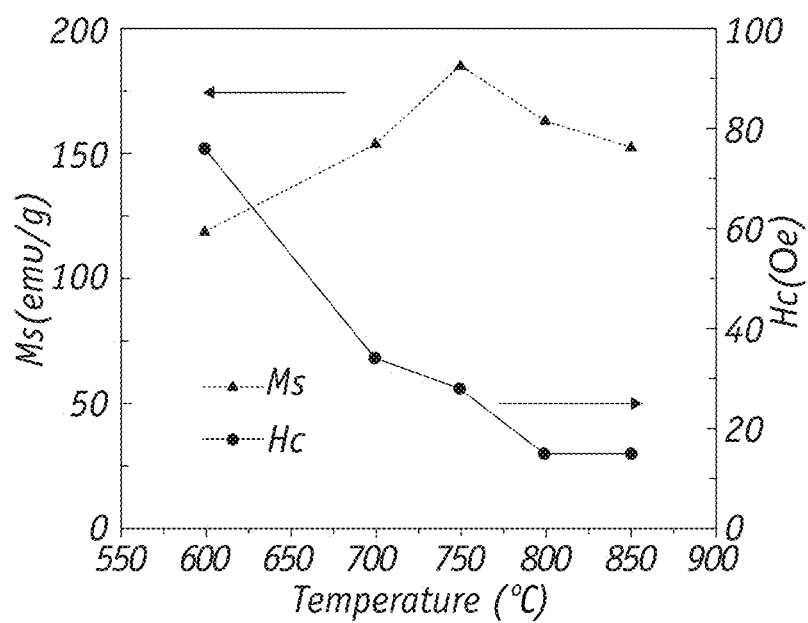
FIG. 6D is a graph of $M_s$ and $H_c$ vs. annealing temperatures for $Co_{95}Fe_5$ nanoparticles.

FIG. 6D is M$_s$ and H$_c$ vs. annealing temperatures for Co$_{95}$Fe$_5$ nanoparticles which were prepared by co-precipitation and annealed at different temperatures for 8 hrs. under an Ar/H$_2$=5% mixture.

The high moment CoFe nanoparticles (MNPs) of the present invention can be employed in many applications including drug delivery, superior contrast agents for highly sensitive magnetic resonance imaging (MRI), magnetic immunoassay, magnetic labeling, waste water treatment, and magnetic separation. When incorporated with magnetic hard phase such as SmFeN and NdFeB, MNPs can efficiently sustain high energy product of permanent magnet at high operating temperatures with the advantage of being lightweight, quiet and enhanced magnetic performance. When incorporated with amorphous ZrBCu or SiNbB matrix, MNPs can efficiently enhance magnetic induction Bs of soft nanocomposite magnetic alloys.

A high temperature permanent nanocomposite magnet was formed by mixing the inventive CoFe nanoparticle and NdFeB nanopowder and then consolidating the mixture to form a bulk nanocomposite magnet. The magnet showed a 200% increase in energy product as compared to a magnet comprising only NdFeB.

High temperature soft nanocomposite magnets can be made by combining the CoFe nanoparticles with a ZrBCu or SiNbB based amorphous matrix and then consolidating the mixture into a soft magnet. The magnets should exhibit increased induction (Bs).

The CoFe nanoparticles can be used in MRI as magnetic contrast agents. Currently, only nanocrystalline thin film nanomaterials have been used in MIII. However, thin film nanomaterials oftentimes exhibit poor mechanical properties because of their rough surfaces and cracking films. The contrast agent typically includes the high moment CoFe nanoparticle and a bio-reagent. In preliminary in vivo animal experiments, PLPEG-functionalized FeCo/GC nanocrystals (with M$_s$=215 emu/g) were injected into rabbits. The experiments confirm the long-lasting positive-contrast intravascular MRI of the blood pool in the rabbit (Seo et al, Nat. Mat. 2006, 5, 971). It is expected that the contrast agent containing inventive CoFe nanoparticles will exhibit even longer-lasting positive contrast intravascular MRI agent properties.

Another potential use for the CoFe nanoparticles is for integrated diagnosis and therapeutic (photothermal ablation) applications, which was demonstrated by Seo et al, Nat. Mat. 2006, 5, 971.

The foregoing has described the principles, preferred embodiment and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method of producing CoFe nanoparticles that comprises: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles which have diameters from 5 nm to 40 nm and which have a magnetic saturation (M$_s$) of from 210 to 235 emu/g, wherein step (c) occurs in an environment that is essentially free of oxygen.

2. The method of claim 1 wherein step (b) comprising preparing an aqueous iron ion solution and an aqueous cobalt ion solution and mixing the aqueous iron ion solution and the aqueous cobalt ion solution to form the second aqueous solution.

3. The method of claim 1 further comprising recovering the CoFe alloy nanoparticles and annealing the recovered CoFe alloy nanoparticles at a temperature from 20° C. to 25° C. and in an environment that is essentially free of oxygen.

4. The method of claim 1 wherein the CoFe alloy nanoparticles comprises Co$_x$Fe$_{100-x}$ where x is from 20 to 95.

5. The method of claim 1 wherein the ratio of [M] to [OH$^-$], where [M]=[Co$^{2+}$]+[Fe$^{3+}$], ranges from 0.1 to 0.2.

6. The method of claim 1 wherein no CoFe$_2$O$_4$ is formed in step (c).

7. The method of claim 1 whereby coprecipitation produces a slurry of CoFe alloy nanoparticles and the method further comprises: (d) washing the slurry of CoFe alloy nanoparticles to remove hydroxide until the slurry reaches a pH of 7; (e) filtering and drying the CoFe alloy nanoparticles; and (f) annealing the washed CoFe alloy nanoparticles in an environment that is essentially free of oxygen.

8. The method of claim 1 wherein the CoFe alloy nanoparticles formed are selected from the group consisting of Co$_{20}$Fe$_{80}$, Co$_{35}$Fe$_{65}$, Co$_{50}$Fe$_{50}$, Co$_{85}$Fe$_{15}$ and Co$_{95}$Fe$_5$.

9. A method of producing CoFe nanoparticles that comprises: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles which have diameters from 4 nm to 8 nm, wherein step (c) occurs in an environment that is essentially free of oxygen.

10. The method of claim 9 wherein the CoFe alloy nanoparticles formed are selected from the group consisting of Co$_{20}$Fe$_{80}$, Co$_{35}$Fe$_{65}$, Co$_{50}$Fe$_{15}$ Co$_{85}$Fe$_{15}$ and Co$_{95}$Fe$_5$.

11. A method of producing CoFe nanoparticles that comprises: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles, wherein step (c) occurs in an environment that is essentially free of oxygen wherein the first aqueous solution and the second aqueous solution are maintained at ambient temperatures between 20° C. to 25° C. and pressure of 24 to 25 Torr under an Ar or Ar/H$_2$ environment.

12. The method of claim 11 wherein the CoFe alloy nanoparticles formed are selected from the group consisting of $Co_{20}Fe_{80}$, $Co_{35}Fe_{65}$, $Co_{50}Fe_{50}$, $Co_{85}Fe_{15}$ and $Co_{95}Fe_{5}$.

13. A method of producing CoFe nanoparticles that comprises: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles, wherein step (c) occurs in an environment that is essentially free of oxygen.

14. The method of claim 13 wherein the CoFe alloy nanoparticles formed are selected from the group consisting of $Co_{20}Fe_{80}$, $Co_{35}Fe_{65}$, $Co_{50}Fe_{50}$, $Co_{85}Fe_{15}$ and $Co_{95}Fe_{5}$.

15. A method of producing CoFe nanoparticles that comprises: (a) providing a first aqueous hydroxide solution; (b) preparing a second aqueous solution containing iron ions and cobalt ions; and (c) depositing measured volumes of the second aqueous solution into the first aqueous solution whereby coprecipitation yields CoFe alloy nanoparticles which have a magnetic saturation ($M_s$) of from 210 to 235 emu/g, wherein step (c) occurs in an environment that is essentially free of oxygen.

16. The method of claim 15 wherein the CoFe alloy nanoparticles formed are selected from the group consisting of $Co_{20}Fe_{80}$, $Co_{35}Fe_{65}$, $Co_{50}Fe_{50}$, $Co_{85}Fe_{15}$ and $Co_{95}Fe_{5}$.

\* \* \* \* \*